United States Patent
Halder

(10) Patent No.: US 12,381,459 B2
(45) Date of Patent: Aug. 5, 2025

(54) MACHINE FOR PRODUCING AN INSULATOR

(71) Applicant: RISOMAT GMBH & CO. KG, Baienfurt (DE)

(72) Inventor: Hubert Halder, Horgenzell (DE)

(73) Assignee: Risomat GmbH & Co. Kg, Baienfurt (DE)

( * ) Notice: Subject to any disclaimer, the term of this patent is extended or adjusted under 35 U.S.C. 154(b) by 0 days.

(21) Appl. No.: 18/829,489

(22) Filed: Sep. 10, 2024

(65) Prior Publication Data

US 2024/0429796 A1    Dec. 26, 2024

Related U.S. Application Data

(63) Continuation of application No. PCT/EP2023/057085, filed on Mar. 20, 2023.

(30) Foreign Application Priority Data

Mar. 30, 2022  (DE) ..................... 10 2022 107 549.4

(51) Int. Cl.
*H02K 15/10* (2025.01)

(52) U.S. Cl.
CPC ......... *H02K 15/10* (2013.01); *H02K 2215/00* (2021.08)

(58) Field of Classification Search
None
See application file for complete search history.

(56) References Cited

U.S. PATENT DOCUMENTS

| | | |
|---|---|---|
| 2,473,332 A | 6/1949 | England |
| 3,514,836 A | 6/1970 | Mason |
| 3,634,932 A | 1/1972 | Mason |
| 6,282,773 B1 | 9/2001 | Luttrell |

(Continued)

FOREIGN PATENT DOCUMENTS

| | | |
|---|---|---|
| CN | 203589968 U | 5/2014 |
| CN | 106451953 A | 2/2017 |

(Continued)

OTHER PUBLICATIONS

International Search Report and Written Opinion (Application No. PCT/EP2023/057085) dated Jun. 27, 2023 (with English translation (21 pages).

(Continued)

*Primary Examiner* — Christopher T Schatz
(74) *Attorney, Agent, or Firm* — BURR PATENT LAW, PLLC

(57) ABSTRACT

Shaping strip for forming an insulator, wherein the shaping strip has a main body having an upper side, and the shaping strip has first and second deflection elements projecting from the upper side of the main body. In a forming procedure of the insulator, in which the insulator is pushed in a thrust direction over the first and the second deflection elements, a first end of a first side of the insulator is pushed in the thrust direction along a second external side of the first deflection element, wherein the first deflection element folds over the first side of the insulator on a first target line, and subsequently one end of a second side of the insulator is pushed in the thrust direction along a second external side of the second deflection element and the second deflection element folds over the second side on a second target line.

9 Claims, 9 Drawing Sheets

(56) References Cited

U.S. PATENT DOCUMENTS

| | | |
|---|---|---|
| 2018/0036920 A1 | 2/2018 | Miyashita et al. |
| 2020/0336034 A1 | 10/2020 | Hengge et al. |

FOREIGN PATENT DOCUMENTS

| | | |
|---|---|---|
| CN | 206237114 U | 6/2017 |
| CN | 209448631 U | 9/2019 |
| CN | 209832803 U | 12/2019 |
| CN | 213534019 U | 6/2021 |
| CN | 113595348 A | 11/2021 |
| DE | 1 763 668 A | 11/1971 |
| DE | 27 35 103 A1 | 2/1979 |
| DE | 269 729 A1 | 7/1989 |
| DE | 10 2017 129 474 A1 | 6/2019 |
| DE | 10 2018 219 846 A1 | 5/2020 |
| JP | S55-147955 A | 11/1980 |
| JP | 2010-239787 A | 10/2010 |
| JP | 2013-143819 A | 7/2013 |

OTHER PUBLICATIONS

German Search Report (Application No. 10 2022 107 549.4) dated Mar. 2, 2023 (9 pages).

Corrected International Preliminary Examination Report (with Chapter II Claims) (Application No. PCT/EP2023/057085) dated Jul. 24, 2024 (originally dated Nov. 28, 2023) (with English translation) (33 pages).

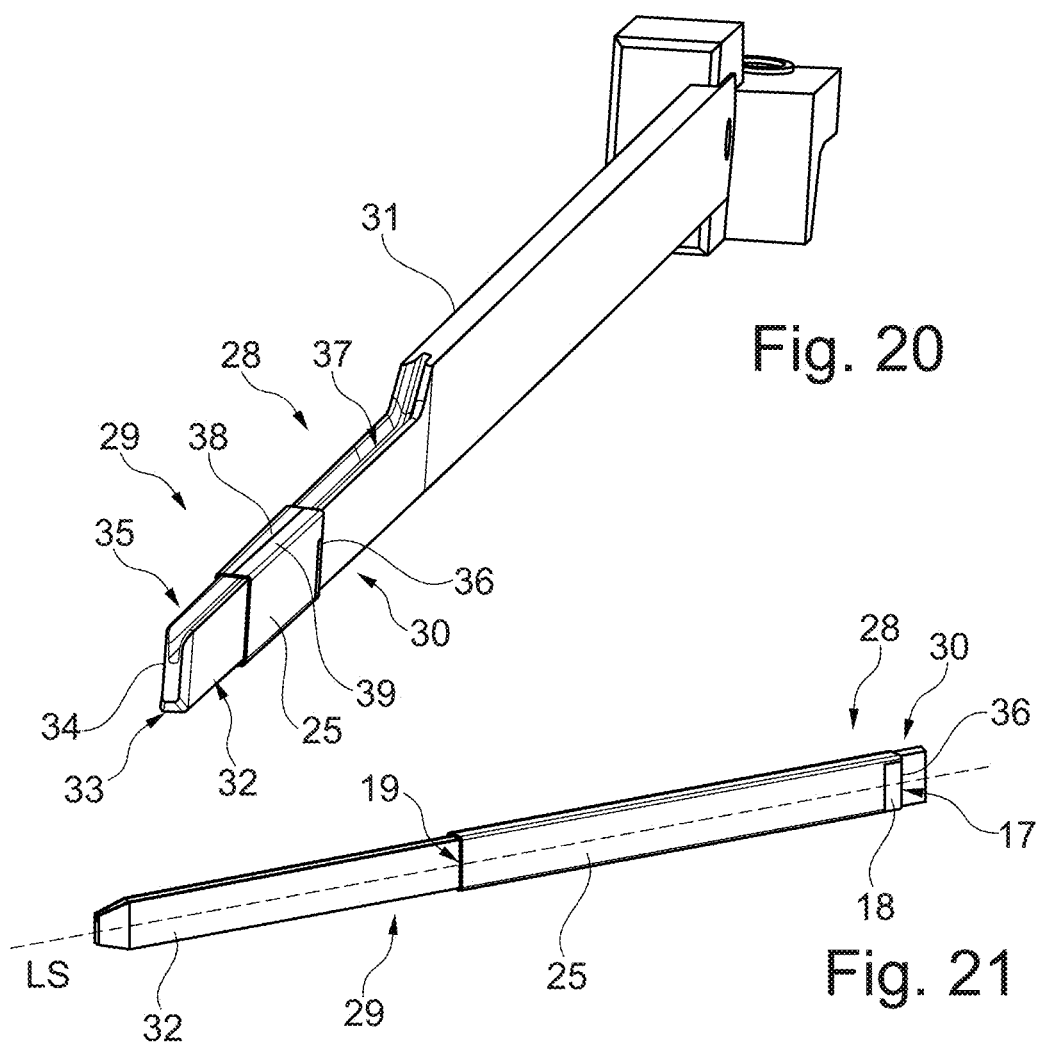
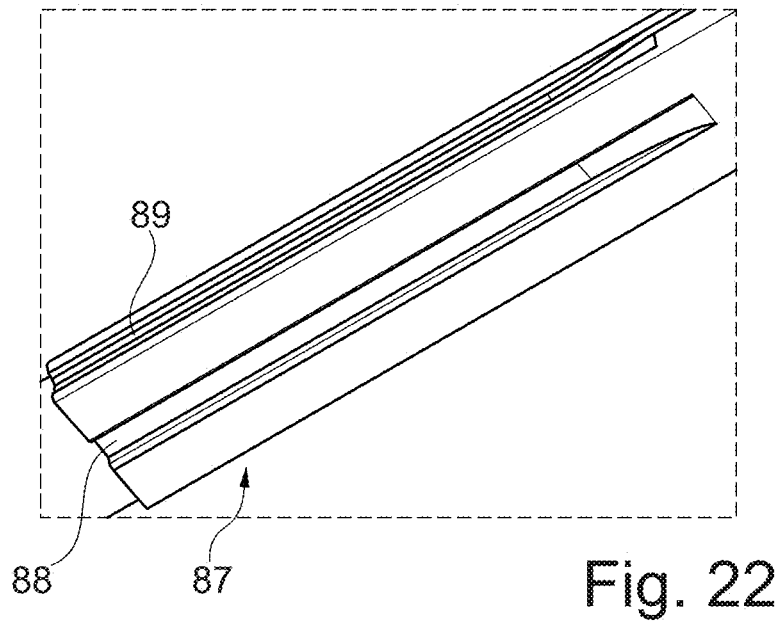

MACHINE FOR PRODUCING AN INSULATOR

CROSS REFERENCE TO RELATED APPLICATIONS

This application is a continuation of International Application No. PCT/EP2023/057085 filed Mar. 20, 2023, which designated the United States, and claims the benefit under 35 USC § 119(a)-(d) of German Application No. 10 2022 107 549.4 filed Mar. 30, 2022, the entireties of which are incorporated herein by reference.

FIELD OF THE INVENTION

The present invention relates to a machine for producing an insulator.

BACKGROUND OF THE INVENTION

Machines for producing an insulator for an electric motor are known. Machines for positioning the insulator on a component of the electric motor are likewise known.

In the production of an insulator and when positioning the insulator on the component of the electric motor, it is an object that a length of the insulator has to be produced in a comparatively precise manner, and the insulator in the direction of its longitudinal extent has to be positioned on the component of the electric motor in a comparatively precise manner.

SUMMARY OF THE INVENTION

It is an object of the present invention to propose an improved machine, an improved component of the machine, and an improved production method, by means of which producing an insulator is simplified and/or by means of which positioning the insulator on the component of the electric motor is simplified. An improved insulator is likewise proposed.

The present invention proceeds from a shaping strip for forming an insulator, wherein the shaping strip has a cuboid main body, wherein the main body has an upper side, wherein the shaping strip has a first and a second deflection element, wherein the first and the second deflection element are present on the upper side of the main body so as to project from the upper side of the main body, wherein the first deflection element by way of a lower side of the first deflection element is connected to the upper side of the main body, wherein the second deflection element by way of a lower side of the second deflection element is connected to the upper side of the main body, wherein the second deflection element is designed to be offset from the first deflection element on the main body, wherein the first deflection element has a first external side, wherein the first deflection element has a second external side, wherein the second external side of the first deflection element is present so as to be opposite the first external side of the first deflection element, wherein the first and the second external side of the first deflection element converge on a front side of the first deflection element in such a way that the first deflection element has an edge on the front side of the first deflection element, wherein the second external side of the first deflection element, when viewed proceeding from the front side of the first deflection element in the thrust direction of the insulator, extends away from the first external side of the first deflection element in such a way that the first deflection element widens proceeding from the front side of the first deflection element, wherein the second deflection element has a first external side, wherein the second deflection element has a second external side, wherein the second external side of the second deflection element is present so as to be opposite the first external side of the second deflection element, wherein the first and the second external side of the second deflection element converge on a front side of the second deflection element in such a way that the second deflection element has an edge on the front side of the second deflection element, wherein the second external side of the second deflection element, when viewed proceeding from the front side of the second deflection element in the thrust direction of the insulator, extends away from the first external side of the second deflection element in such a way that the second deflection element widens when viewed proceeding from the front side of the second deflection element in the thrust direction, wherein the shaping strip is present in such a manner that in a forming procedure of the insulator, in which the insulator is pushed in the thrust direction over the first and the second deflection element, first one end of a first side of the insulator is pushed in the thrust direction along the second external side of the first deflection element, wherein the first deflection element herein folds over the first side of the insulator on a first target line of the insulator, and subsequently one end of a second side of the insulator is pushed in the thrust direction along the second external side of the second deflection element, wherein the second deflection element herein folds over the second side on a second target line of the insulator. Producing the insulator is simplified as a result.

The shaping strip is formed from metal, for example. It is conceivable that the shaping strip is present in one piece. For example, the first and the second deflection element are present so as to be integral to the main body. For example, the first and/or the second deflection element are/is formed in one piece with the main body.

For example, for producing the insulator, an initial material of the insulator, for example an insulator material, is moved in a thrust direction of the insulator along the shaping strip, as a result of which forming of the initial material of the insulator toward a final shape of the insulator takes place by virtue of an interaction between the insulator and the shaping strip.

For example, the first and the second deflection element are formed as webs that project from the upper side of the main body. For example, the deflection elements extend along a length on the main body. For example, a length of a deflection element extends in the thrust direction of the insulator.

For example, the first external side of the first deflection element extends in the thrust direction of the insulator. For example, the first external side of the first deflection element is present in a vertical alignment. For example, when viewed in a thrust direction of the insulator during the forming procedure, the second deflection element is designed to be offset from the first deflection element on the main body. For example, the first external side of the second deflection element extends in the thrust direction of the insulator. For example, the first external side of the second deflection element is present in a vertical alignment. For example, the first external side of the first deflection element and the first external side of the second deflection element are aligned so as to be mutually parallel and present so as to be mutually offset on the shaping strip.

For example, the main body of the shaping strip has a first lateral face, a second lateral face, two end sides, a lower side and an upper side. For example, the upper side extends in a horizontal plane. For example, the main body of the shaping strip has two mutually opposite and mutually spaced-apart lateral faces. It is conceivable that the main body has two mutually opposite and mutually spaced-apart end sides. It is also conceivable that each of the two lateral faces is aligned transversely to each of the two end sides. For example, the main body has a lower side and an upper side, wherein the lower side, the upper side and the two lateral faces extend along the longitudinal axis of the main body. For example, the upper side is present so as to be opposite the lower side and spaced apart from the latter. For example, a lateral face of the main body by way of one end adjoins a first one of the two end sides of the main body, and by way of a second end of the lateral face adjoins a second one of the two end sides of the main body. For example, the end sides of the main body are present in a transverse alignment relative to the longitudinal axis of the main body.

For example, the first and the second deflection element along their lengths extend along the longitudinal axis of the main body. For example, each of lower sides of the first and of the second deflection element extends along the length of the deflection element in the direction of a longitudinal extent of the main body, and in a width of the deflection element in the direction of a width extent of the main body.

For example, the first external side of the first deflection element and the first lateral face of the main body extend in an identical plane. For example, the first external side of the second deflection element and the second lateral face of the main body extend in an identical plane. For example, the first external side of the first deflection element and the first external side of the second deflection element are present so as to be spaced apart over the width of the main body.

It is furthermore proposed that the first deflection element on an upper side of the first deflection element has a first spring member which is present so as to project from the upper side of the first deflection element, wherein the first spring member, when viewed in the thrust direction of the insulator, extends on the first deflection element, wherein a spring member front side of the first spring member is present so as to be spaced apart from the edge of the first deflection element, wherein a spring member upper side of the first spring member, when viewed in the thrust direction proceeding from the upper side of the first deflection element, runs away from the upper side of the first deflection element in such a way that in the forming procedure of the insulator an external edge of the folded-over end of the first side of the insulator bears on a first spring member external side of the first spring member. Producing the insulator is simplified as a result.

For example, the second deflection element on an upper side of the second deflection element has a second spring member which is present so as to project from the upper side of the second deflection element, wherein the second spring member, when viewed in the thrust direction of the insulator, extends on the second deflection element, wherein a spring member front side of the second spring member is present so as to be spaced apart from the edge of the second deflection element, wherein a spring member upper side of the second spring member, when viewed in the thrust direction proceeding from the upper side of the second deflection element, runs away from the upper side of the second deflection element in such a way that in a forming procedure of the insulator an external edge of the folded-over end of the second side of the insulator bears on a first spring member external side of the second spring member.

For example, the spring member upper sides and/or the first spring member external sides of the first and of the second spring member extend along the longitudinal axis of the main body and/or along a longitudinal extent of the first or of the second deflection element.

For example, a plane of extent of the first spring member external side of the first and/or of the second spring member is present so as to be aligned parallel to the plane of the first or the second lateral face of the main body. For example, a plane of extent of the first spring member external side of the first and/or of the second spring member is present in the width extent of the main body so as to be spaced apart from the plane of the first or the second lateral face of the main body. For example, the plane of extent of the first spring member external side of the first and/or of the second spring member is present in the width extent of the main body so as to be spaced apart from the plane of the first external side of the first or of the second deflection element.

For example, the first spring member has a second spring member external side. For example, the second spring member has a second spring member external side. For example, the first and the second spring member external side of the first spring member are present so as to be mutually spaced apart over a width of the first spring member. For example, the first and the second spring member external side of the second spring member are present so as to be mutually spaced apart over a width of the second spring member. It is conceivable that the first and the second spring member are designed with identical widths. For example, the second spring member external side of the first spring member and the first spring member external side of the second spring member extend in a common first plane. For example, the second spring member external side of the second spring member and the first spring member external side of the first spring member extend in a common second plane. For example, the common first plane and the common second plane are present so as to be mutually spaced apart over the width of the first and/or over the width of the second spring member. It is conceivable that the common first plane and the common second plane are present in a mutually parallel alignment.

It is likewise proposed that the shaping strip has a fastening element on the main body, so as to establish the shaping strip on a shaping tool. Comparatively easy assembling of the shaping strip on a shaping tool is implemented as a result.

For example, the fastening element is designed as a through-bore. For example, the through-bore extends along a width of the main body, from one lateral face to the other lateral face of the main body. For example, the shaping strip has two, three or more fastening elements. It is also conceivable that the fastening element is present in the form of a pin, a bolt or an internal thread.

In one variant of embodiment of the present invention, a shaping tool having a shaping strip according to one of the abovementioned embodiments is provided, wherein the shaping tool has a thrust strip, wherein the thrust strip is designed to be cuboid and extends along a longitudinal axis of the thrust strip, wherein thrust strip external sides of the thrust strip that extend along the longitudinal axis are present on a first end of the thrust strip so as to be inwardly offset in such a way that the insulator can be pushed over the inwardly offset thrust strip external sides, wherein the insulator can be disposed so as to bear on the inwardly offset thrust strip external sides, wherein a detent, on which the insulator rests by way of an end side of the insulator in the disposed state, is formed in the transition of the inwardly offset thrust strip external sides to the remaining thrust strip external sides on a second end of the thrust strip in such a way that the insulator by way of the thrust strip is movable along the shaping strip in the thrust direction of the insulator and in the direction of the extent of the longitudinal axis of the thrust strip so as to form the insulator by the shaping strip. A comparatively flexible or universal shaping tool is implemented as a result.

For example, the shaping tool has a thrust strip. It is conceivable that the shaping tool has a drive for moving the thrust strip. For example, the drive is present in such a manner that the thrust strip is able to be moved along the longitudinal axis of the thrust strip. For example, the thrust strip is able to be move so as to reciprocate along the longitudinal axis of the thrust strip. For example, an insulator which is disposed on the thrust strip is able to be moved along the thrust direction of the insulator by the thrust strip.

For example, the shaping tool has a receptacle on which the shaping strip is disposed. For example, the receptacle comprises a guide by means of which the thrust strip is mounted on the receptacle so as to be guided along the longitudinal axis of the thrust strip. For example, the drive is present on the receptacle. It is conceivable that the receptacle forms a cavity in which the shaping strip is present and in which the thrust strip is movably guided. For example, sides of the cavity form a guide for an insulator disposed on the thrust strip when the insulator is being moved along the shaping strip by the thrust strip.

Moreover proposed is a shaping tool having a thrust strip, wherein the thrust strip extends in a length, in a width and in a height, wherein the length is greater than the height, and the height is greater than the width, wherein the thrust strip has two large thrust strip external sides which extend in the height and in the length, wherein the thrust strip has a first and a second small thrust strip external side which extend in the width and in the length, wherein a first small thrust strip external side on the first end has a depression which extends along a longitudinal axis of the thrust strip in such way that in the forming procedure of the insulator the folded-over ends of the first and of the second side of the insulator can engage in the depression. Tilting of the insulator, or tilting of the initial material of the insulator, during the forming procedure is advantageously prevented as a result.

For example, the depression of the thrust strip extends along the longitudinal axis over a length which is greater than a longitudinal extent of the insulator. For example, the depression of the thrust strip extends from an end side of the thrust strip on the first end of the thrust strip up to the detent of the thrust strip. For example, the depression of the thrust strip extends from an end side of the thrust strip on the first end of the thrust strip at least up to the detent of the thrust strip. For example, the depression of the thrust strip extends over the entire length of the thrust strip. For example, the depression of the thrust strip extends from the end side on the first end of the thrust strip up to an end side of the thrust strip on the second end of the thrust strip.

For example, the depression of the thrust strip is designed as a channel, as an indent, or as a notch. For example, the shaping strip and the thrust strip are mounted on the receptacle in such a manner that in a forming procedure of the insulator the first and/or the second spring member engage/engages in the depression of the thrust strip. For example, the shaping strip and the thrust strip are mounted on the receptacle in such a manner that in a forming procedure of the insulator the folded-over end of the first side of the insulator and/or the folded-over end of the second side of the insulator engage/engages in the depression of the thrust strip.

For example, an extension element is disposed on the second end of the thrust strip, for example, so as to be in one piece with the thrust strip. It is also conceivable that the extension element is designed as a thrust bar of the drive, which engages on the end side on the second end of the thrust strip.

It is conceivable that an external side on the second end of the thrust strip, on which the depression is present, in the forming procedure of the insulator at least in portions bears on the upper side of the first deflection element and/or on the upper side of the second deflection element. It is conceivable that the external side of the thrust strip, on which the depression is present, is present so as to be at least in portions guided by the upper side of the first deflection element and/or by the upper side of the second deflection element in the forming procedure of the insulator.

In a further conceivable embodiment a transfer tool is proposed, wherein the transfer tool has a shaping tool according to one of the abovementioned variants of embodiment, wherein the transfer tool has a transfer magazine, wherein the transfer magazine extends in a longitudinal direction, wherein the transfer magazine has a cavity into which the insulator is able to be introduced in the longitudinal direction of the transfer magazine by means of the thrust strip, wherein the cavity is designed to taper conically in the longitudinal direction. A transfer of the insulator into a receptacle of a stator is able to be implemented as a result.

It is conceivable that the receptacle of the stator is designed as a stator groove. It is conceivable that the stator is present in such a manner that a single insulator is able to be introduced into the receptacle of the stator, or two or more insulators are able to be inserted.

The transfer tool is advantageously designed so as to be able to be disposed directly on the receptacle in such a way that after the forming procedure, in which the thrust strip has moved the insulator along the shaping strip, the thrust strip can insert the insulator in the thrust direction of the insulator into the cavity of the transfer tool.

For example, the transfer magazine comprises exactly two cavities. For example, both cavities are of an identical design. It is conceivable that the transfer tool is movably mounted in such a way that the two cavities are able to be moved to the receptacle of the shaping tool in an alternating manner. For example, the transfer tool comprises a motor for moving the transfer tool. It is also conceivable that the transfer magazine has two or more cavities.

It is furthermore proposed that the cavity of the transfer magazine has a first and a second narrow cavity side, wherein the cavity has a first and a second wide cavity side, wherein a first spring element is present on a first internal side of the first wide cavity side of the cavity so as to project from the first internal side, wherein the first spring element extends over the longitudinal extent of the cavity in such a way that in the insertion procedure of the insulator into the cavity a first side of the insulator is deformed into a cavity interior by the first spring element. As a result, the insulator is able to be deformed in such a manner that it is possible to introduce the insulator into the receptacle of the stator.

For example, a second spring element is present on a second internal side of the second wide cavity side so as to project from the second internal side, wherein the second spring element extends over the longitudinal extent of the cavity in such a way that in the insertion procedure of the insulator into the cavity a second side of the insulator is deformed into the cavity interior by the second spring element.

For example, the first and the second spring element are present so as to be mutually opposite and spaced apart in the cavity. It is conceivable that the two narrow cavity sides and the two wide cavity sides of the transfer magazine delimit the cavity, wherein the cavity has two end sides, wherein the end sides are designed to be open in such a way that an insulator is able to be moved into the cavity and/or able to be moved out of the cavity.

It is conceivable that the transfer tool is designed in two or more parts which are connected to one another so as to form the cavity of the transfer tool. Producing the transfer tool is simplified as a result.

It is also proposed that a third spring element is present on an end portion of the cavity on the first narrow cavity side so as to project from an internal side of the first narrow cavity side, wherein a fourth spring element is present on the end portion of the cavity on the second narrow cavity side so as to project from an internal side of the second narrow cavity side, wherein the third and the fourth spring element extend in the longitudinal extent of the cavity in such a way that a third side of the insulator is deformed into the cavity interior by the third spring element, and a fourth side of the insulator is deformed into the cavity interior by the fourth spring element. As a result, the insulator in the state inserted into the transfer tool is present so as to be tapered or decreased in size in such a manner that the insulator can be inserted into a receptacle of a stator.

For example, a spring element is designed as an elevation or as a protrusion on a cavity side. For example, the spring element is present in the manner of a strip, for example, as a strip. For example, the spring elements are present so as to converge conically. It is conceivable that the spring elements are present on the end portion of the cavity so as to converge into the cavity interior in the direction of the end side of the cavity.

An exemplary embodiment of the present invention is a machine for producing an insulator, wherein the machine has a transfer tool according to one of the abovementioned variants of embodiment, and/or wherein the machine has a shaping strip according to one of the abovementioned embodiments, and/or wherein the machine has a shaping tool according to one of the abovementioned embodiments. An automatic production of one or a plurality of insulators is able to be implemented as a result.

It is moreover proposed that the machine has a material magazine, an embossing device, a blanking device, a flanging device, a transport device and/or a forming device. It is conceivable that the material magazine, the embossing device, the blanking device, the flanging device, the transport device and/or the forming device are fastened to a frame of the machine. It is conceivable that the material magazine, the embossing device, the blanking device, the flanging device, the transport device and/or the forming device are present behind one another on the frame when viewed in a feeding direction of an insulator material to be machined by means of the elements mentioned.

It is conceivable that the forming device is a constituent part of the shaping tool.

A further exemplary embodiment of the present invention is a production method for producing an insulator while using a transfer tool according to one of the abovementioned variants of embodiment and/or while using a shaping strip according to one of the abovementioned embodiments and/or while using a shaping tool according to one of the abovementioned embodiments and/or while using a machine according to one of the abovementioned variants of embodiment, wherein the production method comprises the following method steps:

unwinding insulator material from an insulator material roll in a feeding direction, wherein the insulator material roll is held so as to be movable in the material magazine;

embossing a first bead along the feeding direction into the unwound insulator material by a first embossing device;

blanking material from the unwound insulator material in such a way that insulator material is removed in the region of an external edge of the insulator material;

bending back the material remaining in the region of the external edge of the insulator material after the blanking procedure about the first bead embossed in the feeding direction;

embossing a second bead transversely to the feeding direction into the insulator material by a second embossing device;

cutting off one end of the unwound insulator material transversely to the feeding direction in such a way that an insulator is cut off;

forming the insulator by the shaping tool; and introducing the formed insulator in the feeding direction into the transfer tool.

The abovementioned method steps are preferably performed exactly in the sequence in which they are listed above. However, it is also conceivable that the sequence of the method steps can be changed.

For example, an insulator material roll is able to be rotatably mounted on the material magazine in such a way that insulator material can be unwound from the insulator material roll. It is conceivable that the insulator material is present so as to be wound onto the insulator material roll. For example, the insulator material is present in the form of a tape. For example, the machine comprises a transport device for unwinding the insulator material in a feeding direction from the insulator material roll and conveying the insulator material through the machine.

It is conceivable that the following units of the machine are present in succession, when viewed in the feeding direction of the insulator material: material magazine, first embossing device, blanking device, flanging device, first transport device, second embossing device, second transport device, forming device. It is also conceivable that the units are present on the machine in a sequence different to that of the abovementioned sequence. Likewise, it is conceivable that only a single transport device, or more than two transport devices, is/are present on the machine.

It is conceivable that an insulator is severed from the tape-shaped insulator material transversely to the feeding direction of the insulator material. For example, a longitudinal axis of the insulator is present so as to be transverse to the feeding direction of the insulator material. It is furthermore conceivable that the severed insulator is moved in a feeding direction of the insulator that is in the direction of the longitudinal axis of the latter. It is conceivable that a width of the tape-type insulator material defines an overall length of the insulator. For example, the overall length of the insulator is to be considered prior to forming of the cut-off insulator, or of the cut-off insulator material, by the flanging device.

For example, the insulator material is unwound from the insulator material roll and by means of the transport device moved in the feeding direction of the insulator material through the machines. For example, after unwinding, a transverse bead in the feeding direction of the insulator material in the region of an external edge of the insulator material is incorporated into the insulator material by means of a first embossing device. For example, the material is subsequently blanked in the region of the external edge of the insulator material. For example, a blanking location extends along a portion of the transverse bead, or along a plurality of portions of the transverse bead. For example, the insulator material remaining in the region of the external edge is subsequently bent back on the transverse bead by the flanging device. For example, the remaining insulator material of the region of the external edge in the flanged state is present so as to be aligned parallel to the insulator material. By flanging the remaining insulator material of the region of the external edge, the insulator in this region is formed so as to be comparatively reinforced.

It is furthermore conceivable that four longitudinal beads are subsequently incorporated into the insulator material by a further embossing device. It is conceivable that the four longitudinal beads extend transversely to the feeding direction of the insulator material. It is conceivable that each of the four longitudinal beads is present so as to be spaced apart from the remaining three longitudinal beads. For example, the longitudinal beads are present so as to be aligned parallel to one another. For example, a longitudinal bead is present as a target line of the insulator. For example, when viewed in the feeding direction, a spacing between a first and a second of the four longitudinal beads defines a width of the insulator. For example, when viewed in the feeding direction, a spacing between the second longitudinal bead and a third longitudinal bead of the four longitudinal beads defines a height of the insulator. It is conceivable that, when viewed in the feeding direction, a spacing between the third longitudinal bead and a fourth longitudinal bead of the four longitudinal beads a width of the insulator.

It is furthermore conceivable that two longitudinal beads are present as target lines of the insulator. For example, the two longitudinal beads, which are present as target lines of the insulator, enclose therebetween the two remaining longitudinal beads of the four longitudinal beads, when viewed in the feeding direction of the insulator material. For example, the first and the fourth longitudinal bead are formed as a target line. It is also conceivable that all four longitudinal beads are present as target lines, wherein the insulator material on the target lines is to be bent back or folded over by the shaping tool so as to produce the insulator in the final state.

It is furthermore conceivable that the blanked and embossed region of the insulator material is subsequently transported to the shaping tool. For example, the blanked and embossed region of the insulator material is transported to the shaping tool by means of the transport device. For example, the blanked and embossed region of the insulator material is severed transversely to the feeding direction of the insulator material by the shaping tool. For example, a separation line on which the blanked and embossed region of the insulator material is severed is present so as to be parallel to the longitudinal beads of the blanked and embossed region of the insulator material. It is moreover conceivable that the blanked and embossed region of the insulator material is subsequently or simultaneously flanged or bent back along two of the longitudinal beads by the shaping tool. For example, subsequently to or simultaneously with the severing, the insulator material is bent back in the region of the second longitudinal bead and in the region of the third longitudinal bead by the shaping tool. For example, after severing and forming, the blanked and embossed region of the insulator material is present in a U-shape. For example, after severing, the insulator is produced from the severed, blanked and embossed insulator material by means of the shaping tool.

It is likewise proposed that the method step of forming the insulator by the shaping tool comprises the following method steps:
  forming the insulator by the shaping tool in such a way that the insulator is present in a U-shape;
  pushing the insulator onto the thrust strip in such a way that the insulator by way of the end side of the insulator rests on the detent of the thrust strip;
  moving the insulator in the thrust direction of the insulator by way of the thrust strip in such a way that the insulator is moved along an upper side of the shaping strip; and
  forming one end of the first side of the insulator and one end of the second side of the insulator by the shaping tool.

For example, the severed insulator material, which in the final state forms the insulator, after forming to a U-shape is pushed onto the thrust strip. For this purpose, it is conceivable that the thrust strip is moved from an initial position in the feeding direction of the insulator toward the insulator until the insulator by way of the flanged region rests on the detent of the thrust strip. It is furthermore conceivable that the thrust strip, conjointly with the insulator, is subsequently moved onward in the feeding direction of the insulator. It is conceivable that the thrust strip moves the insulator in the feeding direction along the shaping strip in such a way that the first and the second end of the insulator are in each case bent back along a longitudinal bead. For example, the first end of the insulator is bent back along the first longitudinal bead. It is conceivable that the second end of the insulator is bent back along the fourth longitudinal bead. For example, the bent-back first and second end of the insulator are present so as to overlap in the bent-back state.

For example, the thrust strip subsequently moves the insulator onward in the feeding direction, in the direction toward the transfer tool, and inserts the insulator into the transfer tool. It is furthermore conceivable that the thrust strip is subsequently moved counter to the feeding direction of the insulator, wherein the insulator remains in the transfer tool. For example, the thrust strip is subsequently moved counter to the feeding direction, back to its initial position.

For example, the transfer tool is moved conjointly with the insulator toward a stator. It is furthermore conceivable that, in the state of the transfer tool disposed on the stator, the insulator is moved out of the transfer tool into a stator groove of the stator by a movement of an ejector of the machine. For example, the ejector is moved in the feeding direction of the insulator into the transfer tool, wherein the insulator as a result rests on the ejector and is entrained in the feeding direction by the ejector. It is conceivable that the insulator is moved so far into the stator groove by the ejector until the insulator, by way of its flanged region of the external edge, comes to bear on an external face of the stator.

In a further conceivable embodiment, an insulator which has been produced by a production method according to one of the preceding variants of embodiment is proposed.

For example, the insulator extends in a length, in a width and in a height. It is conceivable that the insulator is formed in one piece. For example, the insulator has a first and a second narrow side, and a first and a second longitudinal side. For example, the narrow sides extend along the length and the height of the insulator. For example, the longitudinal sides extend along the length and the width of the insulator.

It is furthermore conceivable that the insulator has four longitudinal beads which extend along the longitudinal axis of the insulator. For example, the longitudinal axis extends along the length of the insulator. For example, the insulator is present so as to be bent back along the four longitudinal beads in such way that edges of the insulator are formed along the longitudinal beads.

For example, a first short end of the insulator of a first side is present so as to be bent back on a first one of the longitudinal beads. For example, a second short end of the insulator of a second side is present so as to be bent back on a fourth one of the longitudinal beads. For example, the first and the second short end are present so as to overlap. It is conceivable that the first and the second short end extend along the length and the height of the insulator and form a narrow lateral face of the insulator. It is conceivable that the first and the second short end of the insulator conjointly, for example, in an overlapping manner, form a narrow lateral face of the insulator.

For example, the insulator has a transverse bead. It is conceivable that the transverse bead extends along the height and the width. It is conceivable that the insulator has a lug which in the region of the transverse bead is connected to the remaining insulator, wherein the lug is bent back on the transverse bead in such a way that the lug is present so as to overlap the remaining insulator. As a result, the insulator is designed to be reinforced in the region of the lug.

It is conceivable that, prior to forming along the longitudinal bead and the transverse bead, the insulator is designed to be rectangular, wherein two edges of the rectangular insulator, in the bent-back state of the insulator, extend along the length of the insulator, and two further edges of the rectangular insulator, in the bent-back state of the insulator, extend along the width and the height of the insulator. Wherein the lug is present on one of the edges that in the bent-back state of the insulator extend along the width and the height of the insulator.

It is conceivable that the insulator, in the state disposed on the stator, by way of the lug rests against or on an external side of the stator. Comparatively simple and comparatively precise positioning of the insulator in a stator groove of the stator is implemented as a result. It is also conceivable that the lug includes the second and the third longitudinal bead, and in the final state of the insulator is present so as to be bent back on the longitudinal beads.

BRIEF DESCRIPTION OF THE DRAWINGS

A plurality of exemplary embodiments will be explained in more detail by means of the following drawings with reference to further details and advantages.

FIG. 20 shows a perspective oblique, lateral view from the front of a thrust strip having an insulator disposed thereon;

FIG. 21 shows a perspective, oblique, lateral view from above of a fragment of the thrust strip according to FIG. 20, having the insulator disposed thereon;

FIG. 22 shows a perspective, oblique, lateral view from above, showing a fragment of an ejector;

DETAILED DESCRIPTION OF THE INVENTION

Figure 1:
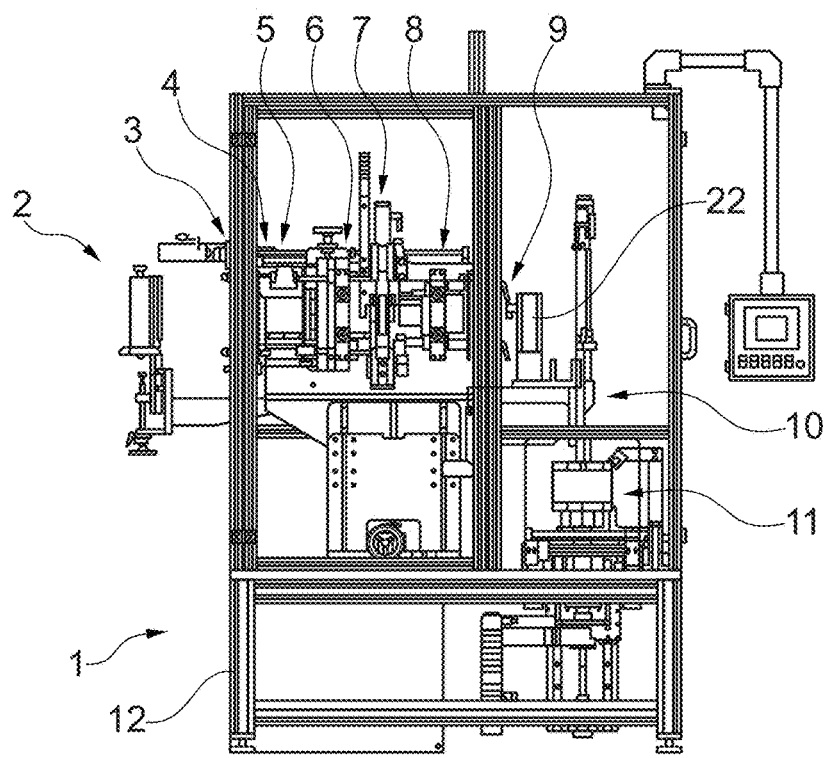
FIG. 1 shows a top view of a machine having a transfer tool disposed thereon.

Shown in FIG. 1 is a top view of a machine 1. Disposed on the machine 1 are a material magazine 2, a first embossing device 3, a blanking device 4, a flanging device 5, a first transport device 6, a second embossing device 7, a second transport device 8, a forming device 9, a transfer tool 10 and a stator 11 on a frame 12 of the machine 1.

For the purpose of improved clarity, the same reference signs are used hereunder for identical elements which may be differently embodied.

Figure 2:
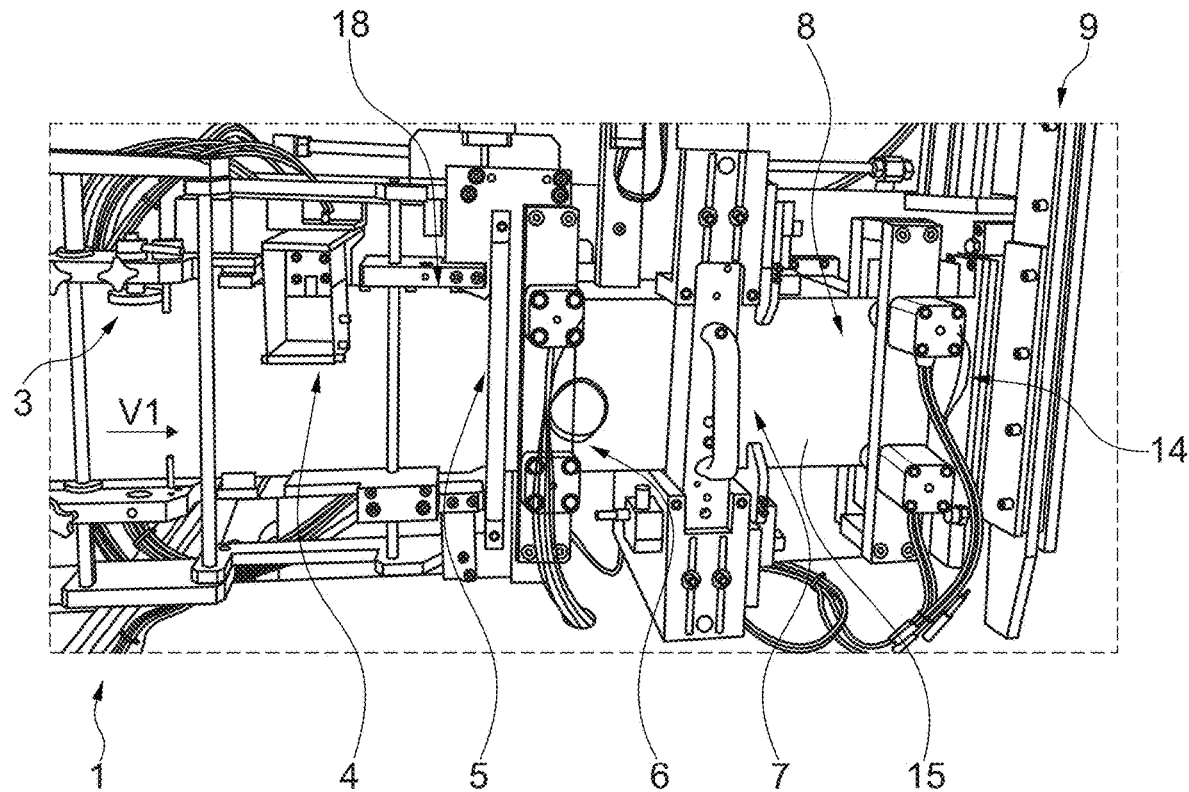
FIG. 2 shows a fragment of a top view of the machine having devices disposed thereon, in an enlarged illustration.
Figure 3:
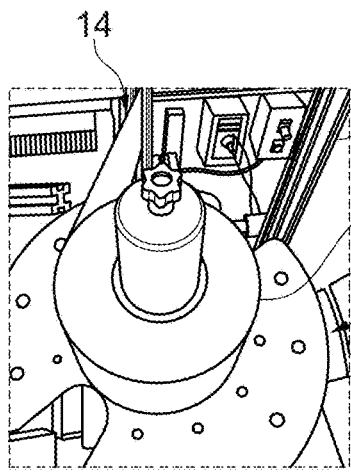
FIG. 3 shows a perspective view from obliquely laterally above of a material magazine having an insulator material roll disposed thereon.

Shown in FIG. 3 is the material magazine 2 having an insulator material roll 13 disposed thereon. One end 14 of the insulator material 15 of the insulator material roll 13 is threaded through the machine 1, passing the individual devices of the machine 1, and ends at the forming device 9 (see also FIG. 2). The insulator material roll 13 is rotatably mounted on the material magazine.

Figure 4:
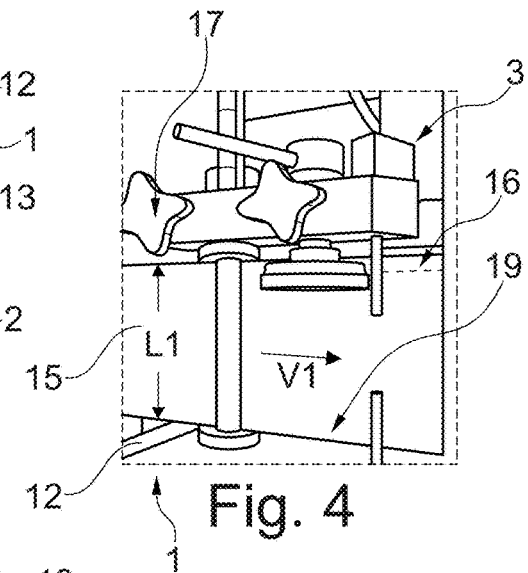
FIG. 4 shows an oblique, lateral, frontal view of an embossing device for embossing a transverse bead.

Shown in FIG. 4 is the first embossing device 3. A transverse bead 16 in the region of an external edge 17 of the insulator material 15 is incorporated into the insulator material 15 by means of the embossing device 3. For example, the transverse bead 16 can be seen as a target line. As a result, the insulator material 15 is present in the region of the transverse bead 16 so as to be comparatively easy to fold back, or fold over, about the transverse bead 16.

Figure 5:
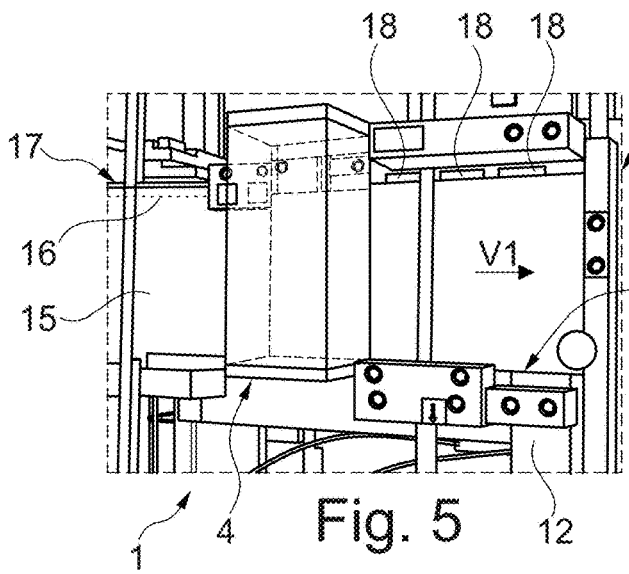
FIG. 5 shows an oblique, lateral, frontal view of a blanking device.

Shown in FIG. 5 is the blanking device 4 which removes portions of a region of the external edge 17 of the insulator material 15 up to the transverse bead 16 in such a way that lugs 18 remain in the region of the external edge 17 of the insulator material 15. The lugs 18 are bent back along the transverse bead 16, the latter being a folding edge, by the flanging device 5 in such a way that, after bending, a length L2 of the insulator material 15 extends from a second external edge 19 up to the transverse bead 16. For example, the insulator material 15 in the wound state on the insulator material roll has a length L1, wherein L1 is greater than L2.

Figure 6:
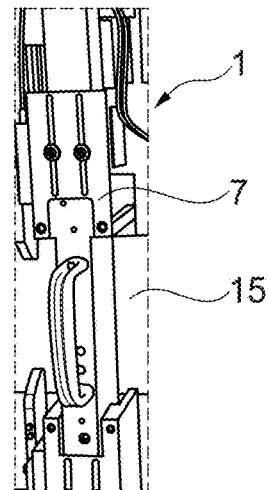
FIG. 6 shows an oblique, lateral, frontal view of a further embossing device for embossing a longitudinal bead.

Shown in FIG. 6 is the second embossing device 7. Longitudinal beads are incorporated into the insulator material 15 by means of the second embossing device 7. For example, the longitudinal beads extend along a longitudinal extent of the insulator material 15.

Figure 7:
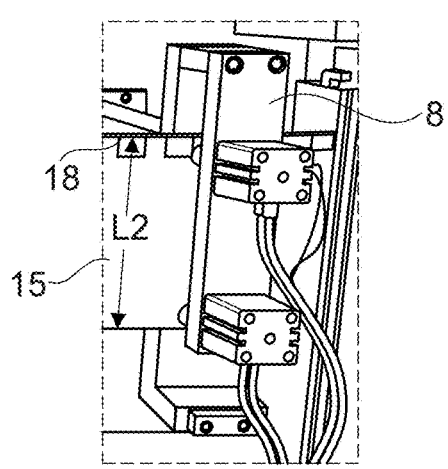
FIG. 7 shows an oblique, lateral, frontal view of a transport device.

Shown in FIG. 7 is the second transport device 8. The insulator material 15 is unwound from the insulator material roll 13 along a feeding direction V1 of the insulator material 15 and transported through the machine 1 up to the forming device 9 by means of the second transport device 8.

Figure 8:
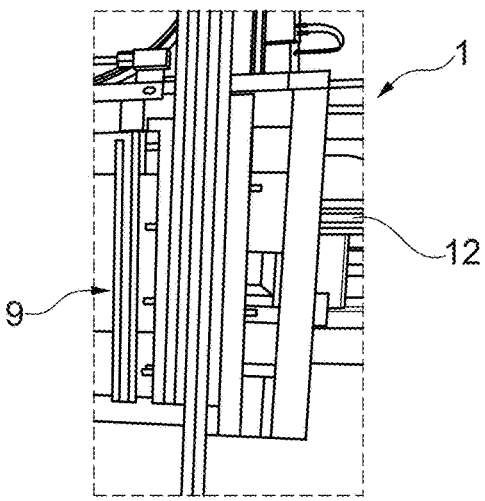
FIG. 8 shows an oblique, lateral, frontal view of a forming device.

Shown in FIG. 8 is the forming device 9. A region of the end 14 of the insulator material 15 is severed from the remaining insulator material 15 by means of the forming device 9. For example, the severed insulator material, i.e. the insulator, is simultaneously bent back along the longitudinal beads incorporated by means of the second embossing device 7 (not shown in FIG. 8).

Figure 9:
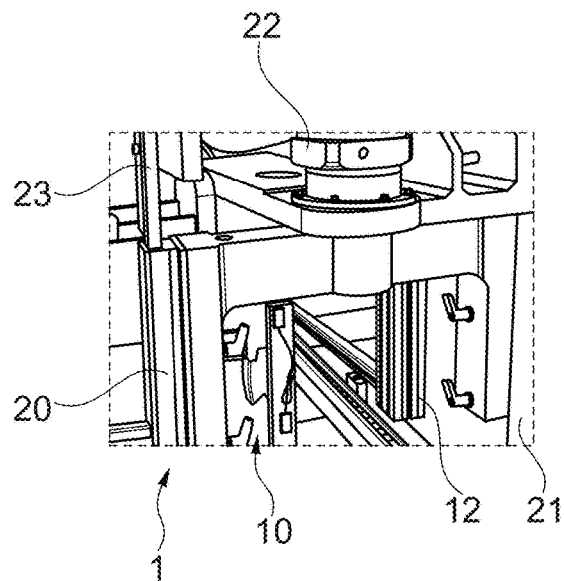
FIG. 9 shows an oblique, lateral, frontal view of a transfer tool.

Shown in FIG. 9 is the transfer tool 10. For example, two transfer magazines 20, 21 are disposed on the transfer tool 10. For example, the transfer magazines 20, 21 are present so as to be rotatable by means of a motor 22 of the transfer tool 10. For example, an insulator is able to be moved from the forming device 9, which has a shaping tool 23, into a transfer magazine 20, 21. For example, the two transfer magazines 20, 21 are of an identical design.

Figure 23:
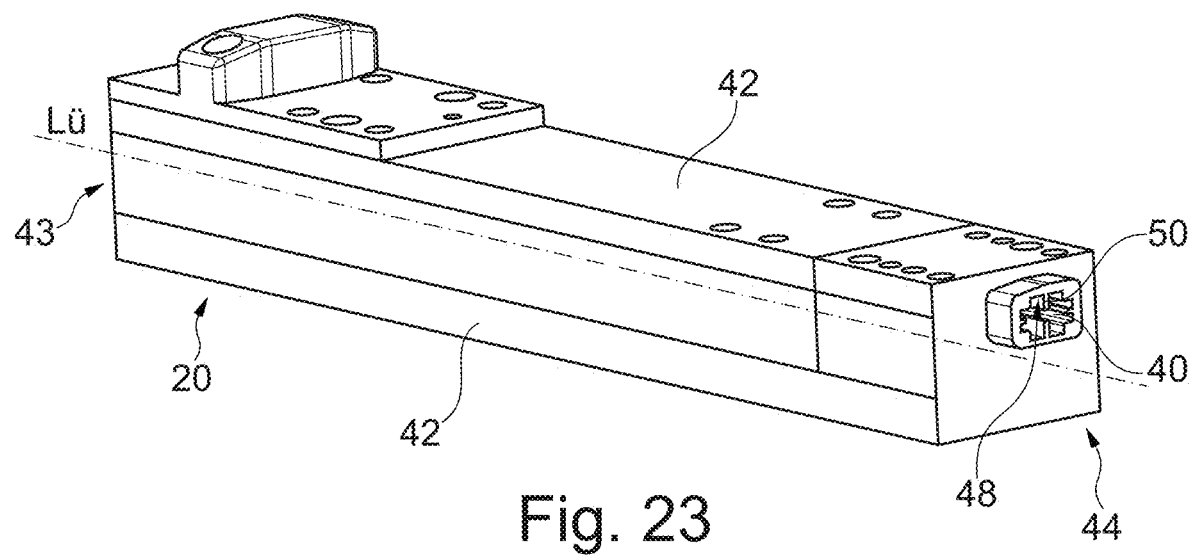
FIG. 23 shows a perspective, oblique, lateral view from below of a transfer magazine of a transfer tool.
Figure 24:
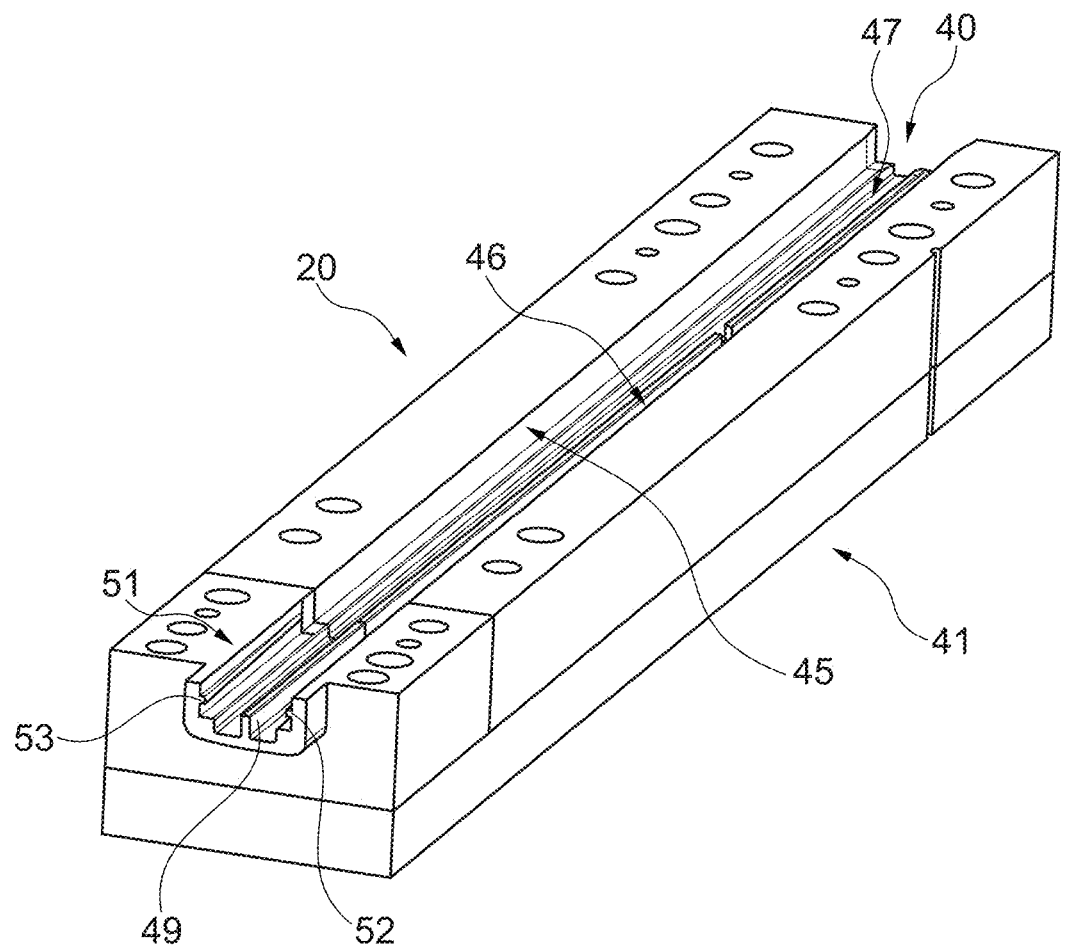
FIG. 24 shows a perspective oblique lateral view from below of one half of the transfer magazine according to FIG. 23.

The transfer magazine 20 has a cavity 40 (see FIGS. 23 and 24). For example, the transfer magazine 20 is present so as to be assembled from at least two transfer magazine parts 41, 42. Producing the transfer magazine 20 is simplified as a result. It is also conceivable that the transfer magazine 20 consists of more than two transfer magazine parts 41, 42. As opposed thereto, it is however also conceivable that the transfer magazine 20 is formed in one piece. It is conceivable, for example, that the transfer magazine is produced by means of a 3D printing method.

For example, the cavity 40 of the transfer magazine 20 tapers along the longitudinal axis LU of the latter so as to converge conically from a first end side 43 up to a second end side 44. For example, the first and the second end side 43, 44 are present so as to be mutually opposite and mutually spaced apart. It is conceivable that the cavity 40 is designed to be open on the first and the second end side 43, 44 in such a way that an insulator 25 is able to be inserted into the cavity 40 along the longitudinal axis LU of the transfer magazine 20 on the first end side 43, and is able to be moved out of the cavity 40 on the second end side 44.

For example, the cavity 40 of the transfer magazine 20 has a first and a second narrow cavity internal side 45, 46 and a first and a second wide cavity internal side 47, 48. It is furthermore conceivable that one spring element 49, 50, which projects from the wide cavity internal side 47, 48, is in each case formed on each of the two wide cavity internal sides 47, 48. For example, each of the spring elements 49, 50 that is present on the wide cavity internal sides 47, 48 runs continuously from the first end side up to the second end side 43, 44 of the cavity 40. It is also conceivable that the spring elements 49, 50 are formed so as to be mutually spaced apart and mutually opposite. It is furthermore conceivable that the spring elements 49, 50 are present so as to converge conically along the longitudinal axis LÜ of the transfer magazine 20, from the first to the second end side 43, 44.

For example, one further spring element 52, 53 is in each case formed on an end portion 51 of the cavity 40 in the region of the second end side 44 on the narrow cavity internal sides 45, 46. It is conceivable that the spring elements 52, 53 are formed so as to be mutually spaced apart and mutually opposite. It is furthermore conceivable that the spring elements 52, 53 are present so as to converge conically in the direction of the second end side 44 along the longitudinal axis LU of the transfer magazine 20.

Figure 10:
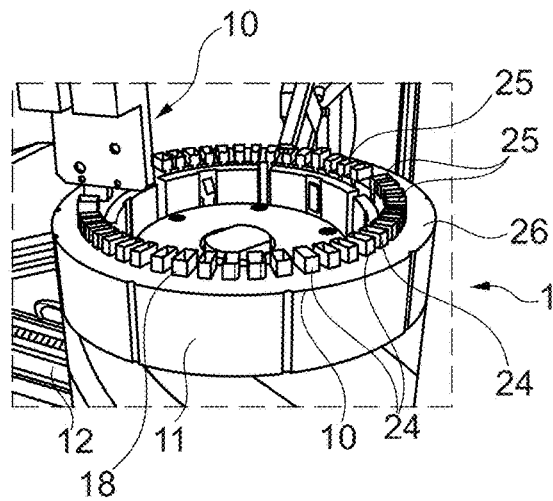
FIG. 10 shows a view from obliquely laterally above of a stator having insulators incorporated into stator grooves of the stator.
Figure 11:
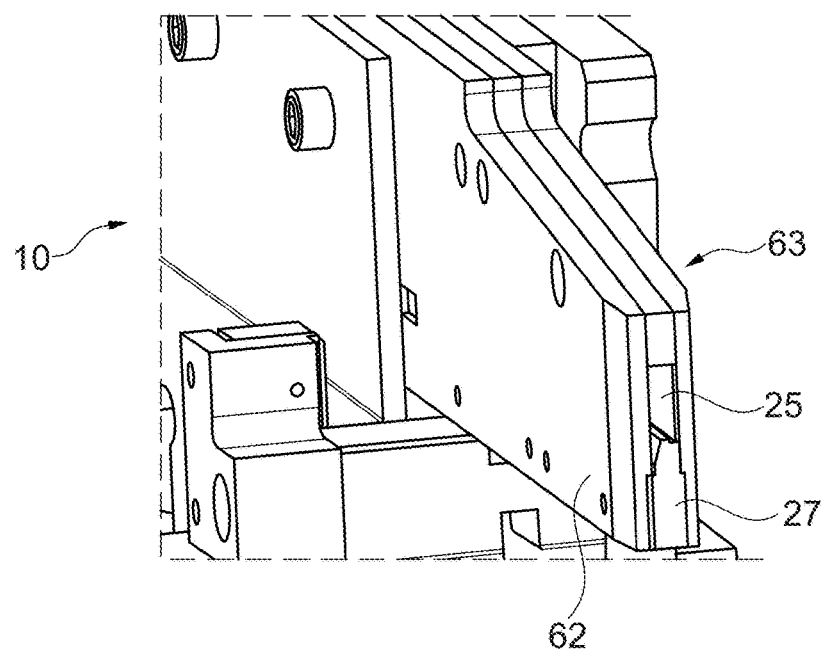
FIG. 11 shows a view from obliquely laterally below of the shaping tool having a shaping strip disposed thereon.

Shown in FIG. 10 is the stator 11. For example, the stator 11 comprises a plurality of stator grooves 24. For example, insulators 25 are able to be inserted into the stator grooves 24 by way of the transfer tool 10. By way of example, a stator 11, which in part is present with insulators 25, is shown in FIG. 10.

For example, in the state of the insulators 25 completely inserted into the stator grooves 24, each insulator 25 by way of its lug 18 rests on an external side 26 of the stator 11.

Figure 14:
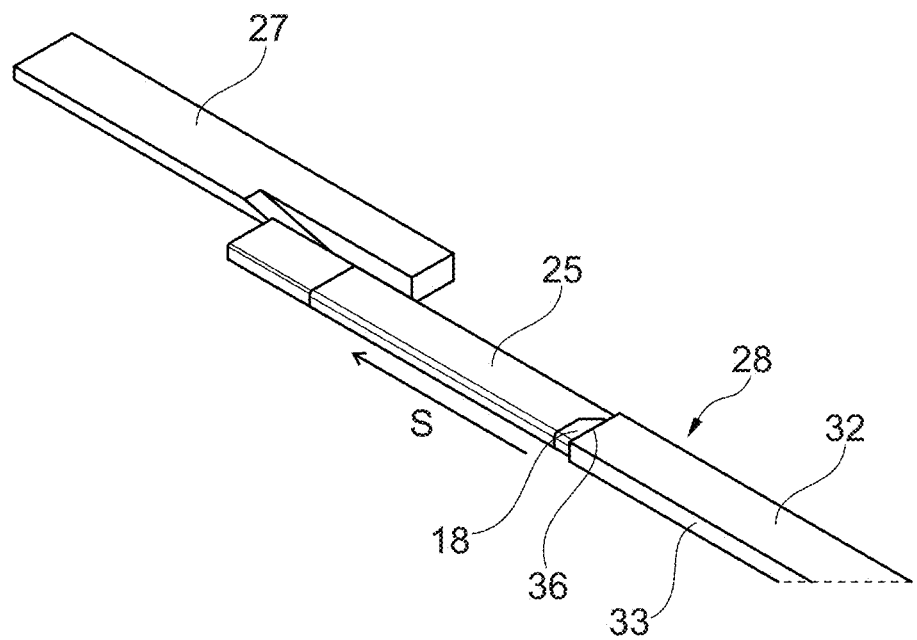
FIG. 14 shows an oblique, lateral, frontal view from above of a shaping strip having a thrust strip present thereon and an insulator disposed thereon.
Figure 15:
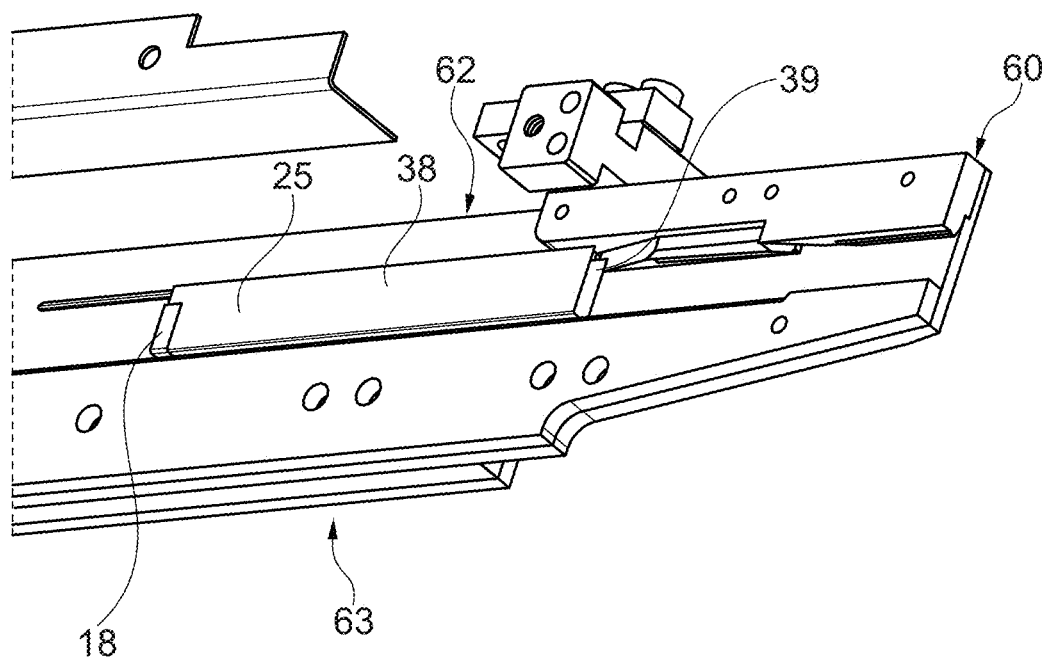
FIG. 15 shows an oblique, lateral view from below of a shaping tool having a shaping strip and an insulator disposed thereon, wherein parts of the shaping tool are omitted.

Shown schematically in FIG. 14 is an arrangement of a shaping strip 27 and of a thrust strip 28 having an insulator 25 disposed thereon. Shown in FIG. 14 is a beginning in terms of moving the insulator 25 past the shaping strip 27. For example, the insulator 25 is moved past the shaping strip 27 in the thrust direction S of the insulator 25 by means of the thrust strip 28.

For example, the thrust strip 28 comprises a first end 29 and a second end 30 (see also FIGS. 20 and 21). For example, the thrust strip 28 is connected to an extension element 31 at the second end 30. For example, a spacing of thrust strip external sides 32 to 35 on the first end 29 is smaller than a spacing of the thrust strip external sides 32 to 35 on the second end 30. For example, a detent 36 on the thrust strip 28 at the transition from the first to the second end 29, 30 is formed as a result. For example, the insulator 25 in the disposed state impacts the detent 36 by way of the external edge 17. As a result, the insulator 25 can be moved in the thrust direction S of the insulator along a longitudinal axis LS of the thrust strip 28 by means of the thrust strip 28.

It is conceivable that the thrust strip has a depression 37 on the narrow external side 35. For example, ends 38, 39 of the insulator 25 are able to be moved into the depressions 37 by means of the shaping strip 27 during the forming procedure.

Figure 12:
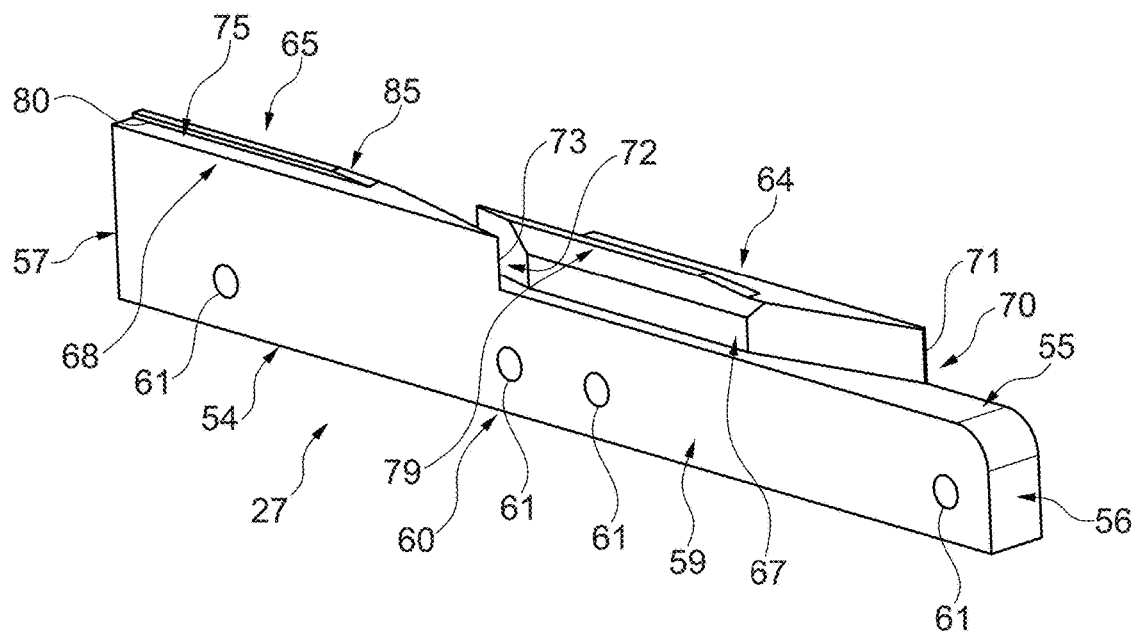
FIG. 12 shows an oblique, lateral, frontal view from above of a shaping strip.
Figure 13:
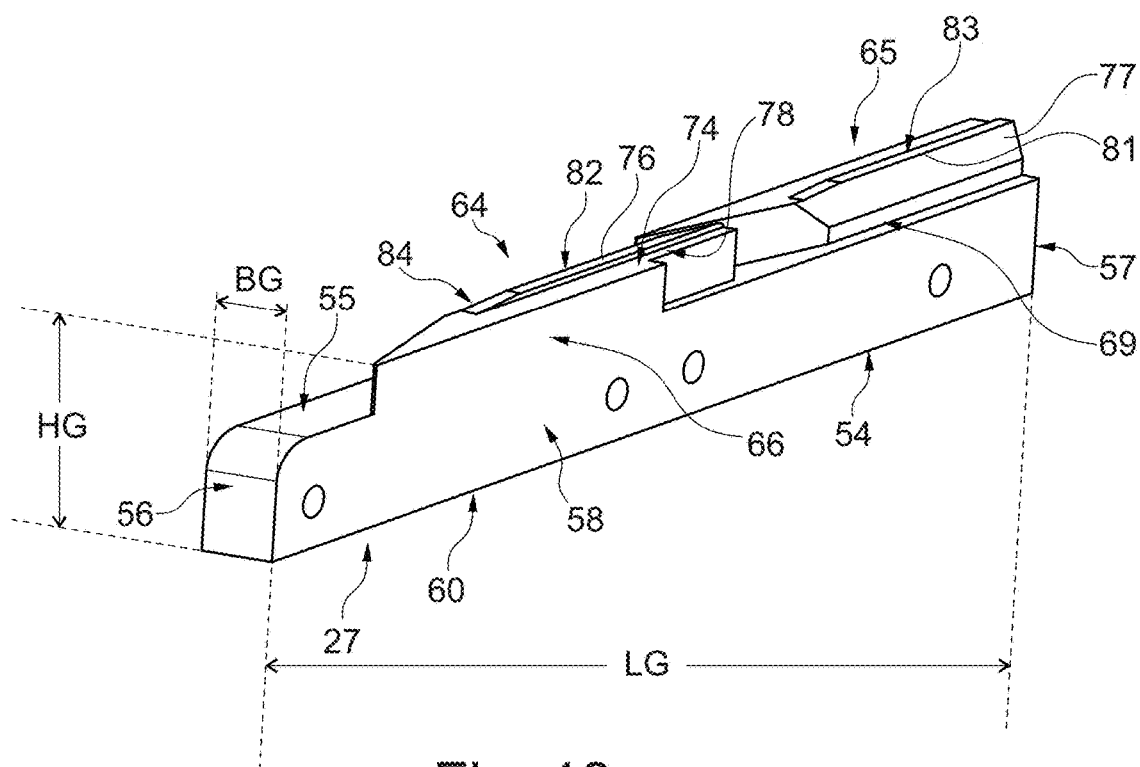
FIG. 13 shows an oblique, lateral, frontal view from above of the shaping strip according to FIG. 12.

The shaping strip 27 is shown in FIGS. 12 and 13. The shaping strip 27 has a main body 54. For example, the main body 54 comprises an upper side 55, a first and a second end side 56, 57, a first and a second lateral face 58, 59, and a lower side 60. It is also conceivable that fastening elements 61 for fastening the shaping strip to a receptacle 62 of a shaping tool 63 are present on the main body 54. It is conceivable that the main body extends in a length LG, a height HG and a width BG.

For example, the shaping tool 63 is part of the transfer tool 10.

The shaping strip 27 has a first and a second deflection element 64, 65 on the upper side 55 of the main body 54. The first as well as the second deflection element 64, 65 bear on the upper side 55 by way of a lower side of the deflection elements 64, 65. It is conceivable that the first and the second deflection element 64, 65 are present in one piece with the main body 54. Each of the deflection elements 64, 65 comprises a first and a second external side 66 to 69. For example, the first external side 66 and the second external side 67 of the first deflection element 64 converge on a front side 70 of the first deflection element 64 in such a way that the first deflection element 64 has an edge 71 on the front side 70. For example, the first external side 68 and the second external side 69 of the first deflection element 65 converge on a front side 72 of the first deflection element 65 in such a way that the first deflection element 65 has an edge 73 on the front side 72.

For example, the first deflection element 64 has an upper side 74. It is conceivable that the second deflection element 65 has an upper side 75.

For example, a first spring member 76 is formed on the upper side 74 of the first deflection element 64. For example, a second spring member 77 is formed on the upper side 75 of the first deflection element 65. For example, the spring members 76, 77 are present in one piece with the main body 54 of the shaping strip 27.

For example, the first spring member 76 has a first and a second spring member external side 78, 79. For example, the second spring member 77 has a first and a second spring member external side 80, 81. It is moreover conceivable that the first spring member 76 has a first spring member upper side 82, and the second spring member 77 has a second spring member upper side 83. For example, a spring member front side 84 of the first spring member 76 is present so as to project from the upper side 74, running away from the latter. For example, a spring member front side 85 of the second spring member 77 is present so as to project from the upper side 75, running away from the latter.

The process of a movement of the insulator 25 along the shaping strip 27 is shown in FIGS. 16 to 19 and 11. The shaping tool 63, in particular, a receptacle 62 of the shaping tool 63, is partially depicted in FIGS. 16 to 19. The thrust strip which moves the insulator 25 along the shaping strip 27, is likewise not illustrated in FIGS. 16 to 19. For example, a guide in the form of a guiding web 86 is present on the receptacle 62.

Figure 16:
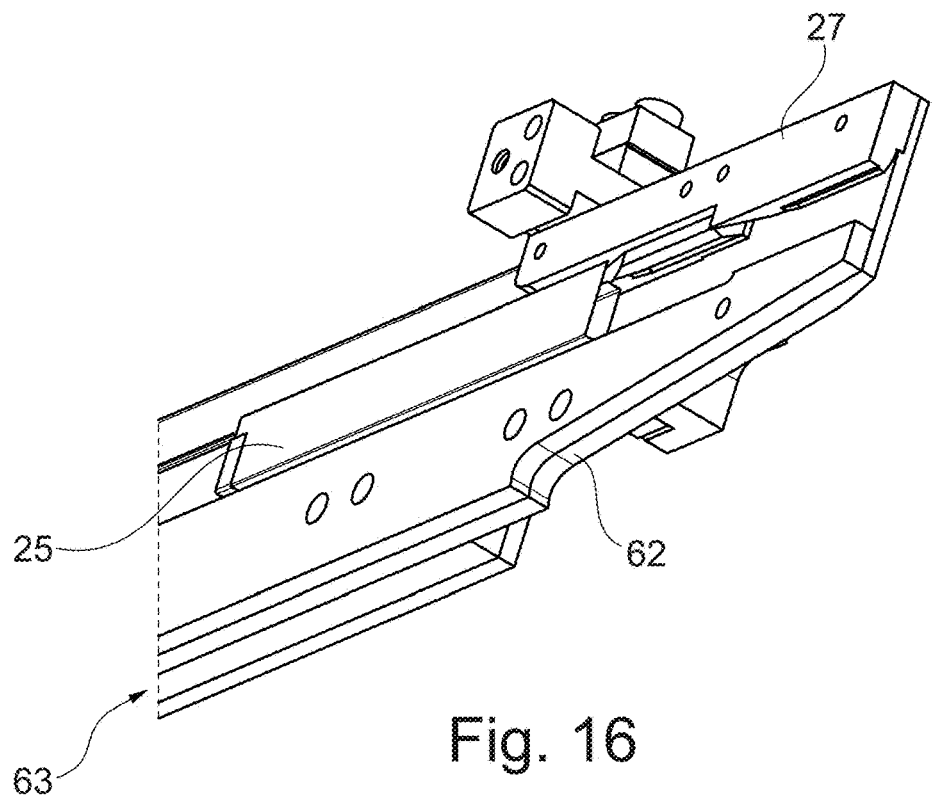
FIG. 16 shows the shaping tool according to FIG. 15, wherein the insulator is present so as to be moved onward in the thrust direction of the insulator along the shaping tool in such a way that one end of a first side of the insulator is present so as to be bent back.
Figure 17:
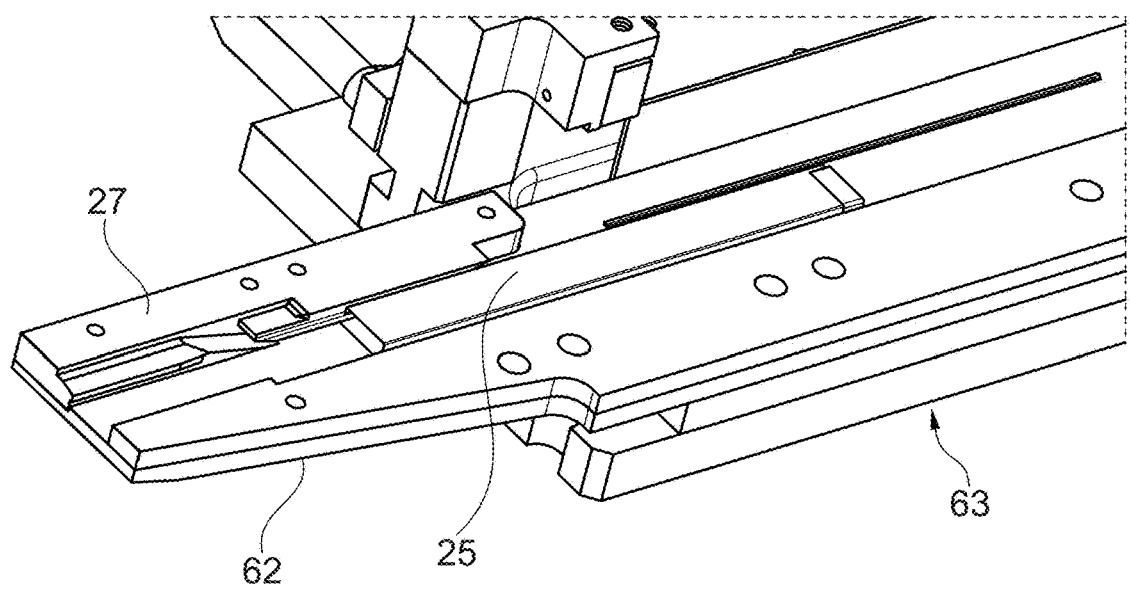
FIG. 17 shows a further oblique, lateral view from below of the shaping tool having the shaping strip and the insulator disposed thereon, wherein parts of the shaping tool are omitted, wherein the insulator is present so as to be moved onward in the thrust direction of the insulator relative to the position according to FIG. 16 in such a way that the end of the first side of the insulator rests on a spring member external side of the shaping strip.

In a first step, the insulator 25 is moved toward the shaping strip in such a way that the insulator 25 by way of the first end 38 rests on the first deflection element 64 on the second external side 67 and by the latter is bent inward in the direction toward the second end 39 along a target line, i.e. a longitudinal bead (FIG. 16). The first end 38 herein bears on the upper side 74 and by way of an external edge rests on the first spring member external side 78 of the first spring member 76. For example, the first end 38 is bent away from the second end 39 by the first spring member external side 47 (FIG. 17).

Figure 18:
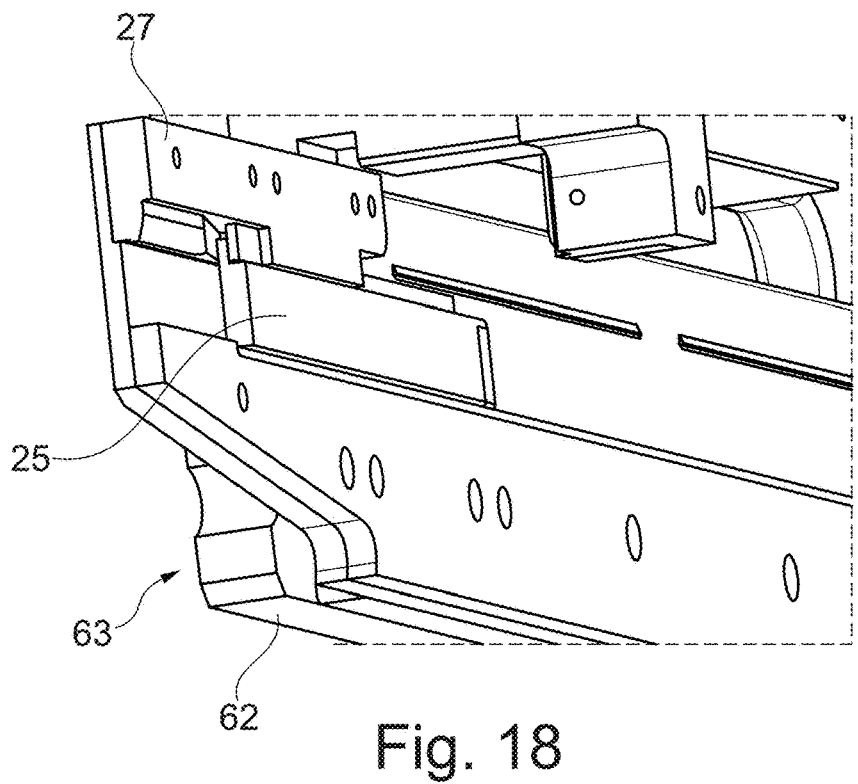
FIG. 18 shows a further oblique, lateral view from below of the shaping tool having the shaping strip and the insulator disposed thereon, wherein parts of the shaping tool are omitted, wherein the insulator is present so as to be moved onward in the thrust direction of the insulator relative to the position according to FIG. 17 in such a way that one end of a second side of the insulator rests on a second deflection element of the shaping strip.
Figure 19:
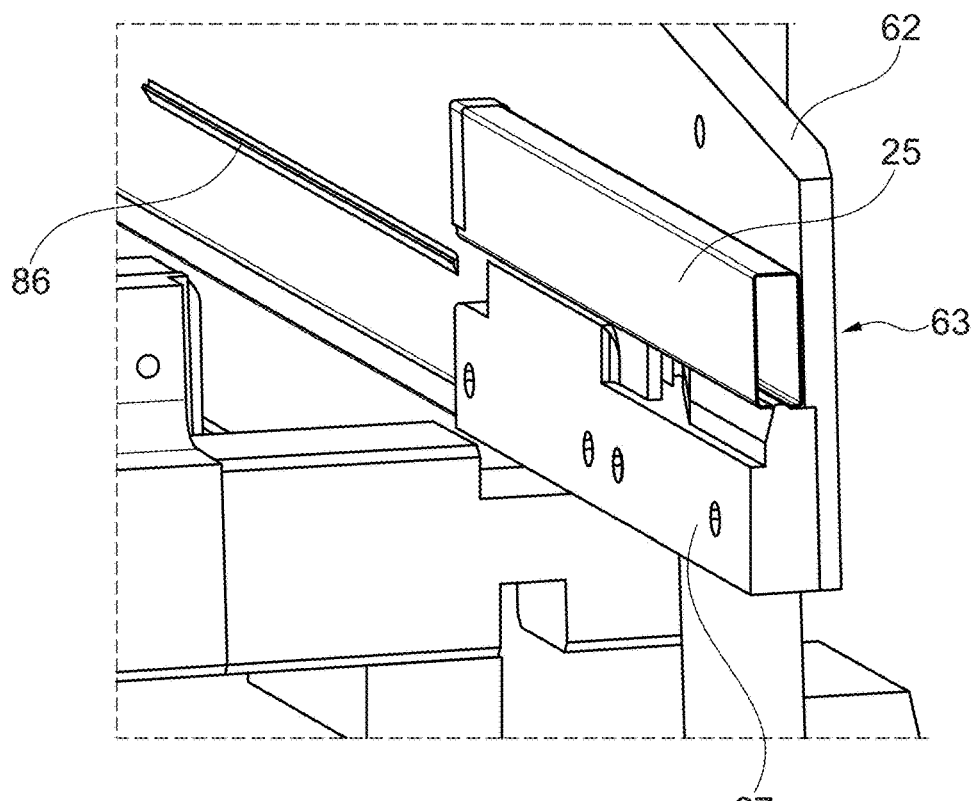
FIG. 19 shows a further oblique, lateral view from below of the shaping tool having the shaping strip and the insulator disposed thereon, wherein parts of the shaping tool are omitted, wherein the insulator is present so as to moved onward in the thrust direction of the insulator in such a way that ends of the first and of the second side of the insulator are present so as to be bent back.

In a next step, the insulator 25 by way of the second end 39 is moved toward the second deflection element 65 in such a way that the second end 39 rests on the second external side 69 and by the latter is bent inward in the direction toward the first end 38 along a target line, i.e. a longitudinal bead (FIG. 18). The second end 39 herein bears on the upper side 75 and by way of an external edge rests on the first spring member external side 80 of the second spring member 77. For example, the second end 39 is bent away from the first end 38 by the first spring member external side 80 (FIG. 19). As a result, the external edges of the first and of the second end 38, 39 are mutually spaced apart by a width of the first and/or of the second spring member 76, 77. Tilting of the insulator 25 during the shaping procedure on the shaping strip 27 is likewise prevented as a result.

Shown in FIG. 22 is an ejector 87. For example, the ejector 87 comprises clearances 88, 89 in which the spring elements 49, 50, 52, 53 of the transfer magazine 20 can engage.

LIST OF REFERENCE SIGNS

1 Machine
2 Material magazine
3 Embossing device
4 Blanking device
5 Flanging device
6 Transport device
7 Embossing device
8 Transport device
9 Forming device
10 Transfer tool
11 Stator
12 Frame
13 Insulator material roll
14 End
15 Insulator material
16 Transverse bead
17 External edge
18 Lug
19 External edge
20, 21 Transfer magazine
22 Motor
23 Shaping tool
24 Stator groove
25 Insulator
26 External side
27 Shaping strip
28 Thrust strip
29, 30 End
31 Extension element
32-35 Thrust strip external side
36 Detent
37 Depression
38 End
39 End
40 Cavity
41, 42 Transfer magazine part
43, 44 End side
45-48 Cavity internal side
49, 50 Spring element 51 End portion
52, 53 Spring element
54 Main body
55 Upper side
56, 57 End side
58, 59 Lateral face
60 Lower side
61 Fastening element
62 Receptacle
63 Shaping tool
64, 65 Deflection element
66-69 External side
70, 72 Front side
71, 73 Edge
74, 75 Upper side
76, 77 Spring member
78-81 Spring member external side
82, 83 Spring member upper side
84, 85 Spring member front side
86 Guiding web
87 Ejector 88, 89 Clearance

The invention claimed is:

1. A shaping tool having a shaping strip for forming an insulator, wherein the shaping tool has a thrust strip, wherein the thrust strip is designed to be cuboid and extends along a longitudinal axis, wherein thrust strip external sides of the thrust strip that extend along the longitudinal axis are present on a first end of the thrust strip so as to be inwardly offset in such a way that the insulator can be pushed over the inwardly offset thrust strip external sides, wherein the insulator can be disposed so as to bear on the inwardly offset thrust strip external sides, wherein a detent, on which the insulator rests by way of an end side of the insulator in the disposed state, is formed in a transition from the inwardly offset thrust strip external sides to remaining thrust strip external sides in such a way that the insulator by way of the thrust strip is movable along the shaping strip in a thrust direction of the insulator and in a direction of an extent of the longitudinal axis of the thrust strip so as to form the insulator by the shaping strip, wherein the shaping strip has a cuboid main body, wherein the main body has an upper side, wherein the shaping strip has a first and a second deflection element, wherein the first and the second deflection element are present on the upper side of the main body so as to project from the upper side of the main body, wherein the first deflection element by way of a lower side of the first deflection element is connected to the upper side of the main body, wherein the second deflection element by way of a lower side of the second deflection element is connected to the upper side of the main body, wherein the second deflection element is designed to be offset from the first deflection element on the main body, wherein the first deflection element has a first external side, wherein the first deflection element has a second external side, wherein the second external side of the first deflection element is present so as to be opposite the first external side of the first deflection element, wherein the first and the second external sides of the first deflection element converge on a front side of the first deflection element in such a way that the first deflection element has an edge on the front side of the first deflection element, wherein the second external side of the first deflection element, when viewed proceeding from the front side of the first deflection element in the thrust direction of the insulator, extends away from the first external side of the first deflection element in such a way that the first deflection element widens proceeding from the front side of the first deflection element, wherein the second deflection element has a first external side, wherein the second deflection element has a second external side, wherein the second external side of the second deflection element is present so as to be opposite the first external side of the second deflection element, wherein the first and the second external side of the second deflection element converge on a front side of the second deflection element in such a way that the second deflection element has an edge on the front side of the second deflection element, wherein the second external side of the second deflection element, when viewed proceeding from the front side of the second deflection element in the thrust direction of the insulator, extends away from the first external side of the second deflection element in such a way that the second deflection element widens when viewed proceeding from the front side of the second deflection element in the thrust direction, wherein the shaping strip is present in such a manner that in a forming procedure of the insulator, in which the insulator is pushed in the thrust direction over the first and the second deflection element, first one end of a first side of the insulator is pushed in the thrust direction along the second external side of the first deflection element, wherein the first deflection element folds over the first side of the insulator herein on a first target line of the insulator, and subsequently one end of a second side of the insulator is pushed in the thrust direction along the second external side of the second deflection element, wherein the second deflection element herein folds over the second side on a second target line of the insulator.

2. The shaping tool as claimed in claim 1, wherein the first deflection element on an upper side of the first deflection element has a first spring member which is present so as to project from the upper side of the first deflection element, wherein the first spring member on the first deflection element extends in the thrust direction of the insulator, wherein a front side of the first spring member is present so as to be spaced apart from the edge of the first deflection element, wherein a spring member upper side of the first spring member, when viewed in the thrust direction, proceeding from the upper side of the first deflection element, runs away from the upper side of the first deflection element in such a way that in the forming procedure of the insulator an external edge of the folded-over end of the first side of the insulator bears on a first spring member external side of the first spring member.

3. The shaping tool as claimed in claim 1, wherein the shaping strip has a fastening element on the main body so as to establish the shaping strip on the shaping tool.

4. The shaping tool as claimed in claim 1, wherein the thrust strip extends in a length, in a width and in a height, wherein the length is greater than the height and the height is greater than the width, wherein the thrust strip external sides include two large thrust strip external sides which extend in the height and in the length, wherein the thrust strip external sides include a first and a second small thrust strip external side which extend in the width and in the length, wherein the first small thrust strip external side on a first small thrust strip end has a depression which extends along the longitudinal axis of the thrust strip in such a way that in the forming procedure of the insulator the folded-over ends of the first and of the second side of the insulator can engage in the depression.

5. A transfer tool having the shaping tool as claimed in claim 1, wherein the transfer tool has a transfer magazine, wherein the transfer magazine extends in a longitudinal direction of the transfer magazine, wherein the transfer magazine has a cavity in which the insulator is able to be introduced in the longitudinal direction of the transfer magazine by means of the thrust strip, wherein the cavity is designed to taper conically in the longitudinal direction of the transfer magazine.

6. The transfer tool as claimed in claim 5, wherein the cavity of the transfer magazine has a first and a second narrow cavity side, wherein the cavity has a first and a second wide cavity side, wherein a first spring element is present on a first internal side of the first wide cavity side of the cavity so as to project from the first internal side, wherein the first spring element extends over a longitudinal extent of the cavity in such a way that in an insertion procedure of the insulator into the cavity a first side of the insulator is deformed into a cavity interior by the first spring element.

7. The transfer tool as claimed in claim 5, further comprising a third spring element on an end portion of the cavity on a first narrow cavity side so as to project from an internal side of the first narrow cavity side, wherein a fourth spring element is present on the end portion of the cavity on a second narrow cavity side so as to project from an internal side of the second narrow cavity side, wherein the third and the fourth spring element extend in a longitudinal extent of the cavity in such a way that a third side of the insulator is deformed into the cavity interior by the third spring element, and a fourth side of the insulator is deformed into the cavity interior by the fourth spring element.

8. A machine for producing an insulator, having a transfer tool as claimed in claim 5.

9. The machine as claimed in claim 8, further comprising a material magazine, an embossing device, a blanking device, a flanging device, a transport device and/or a forming device.

* * * * *